Jan. 25, 1949. M. N. LEBEDEFF 2,459,823
PIPE MITERING APPARATUS
Filed Feb. 11, 1946 3 Sheets-Sheet 1
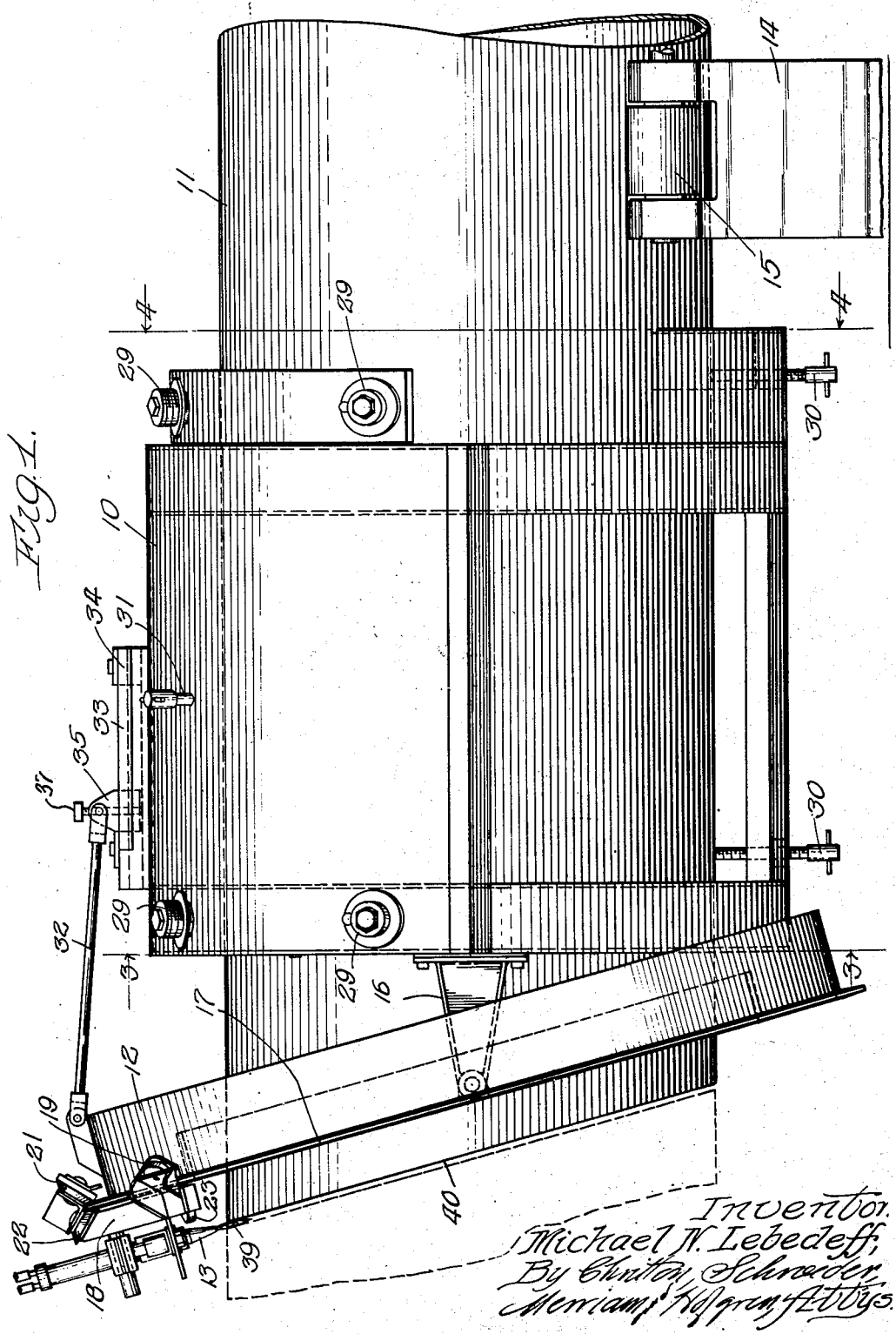

Jan. 25, 1949.　　　M. N. LEBEDEFF　　　2,459,823
PIPE MITERING APPARATUS
Filed Feb. 11, 1946　　　　　　　　　　　　3 Sheets-Sheet 2
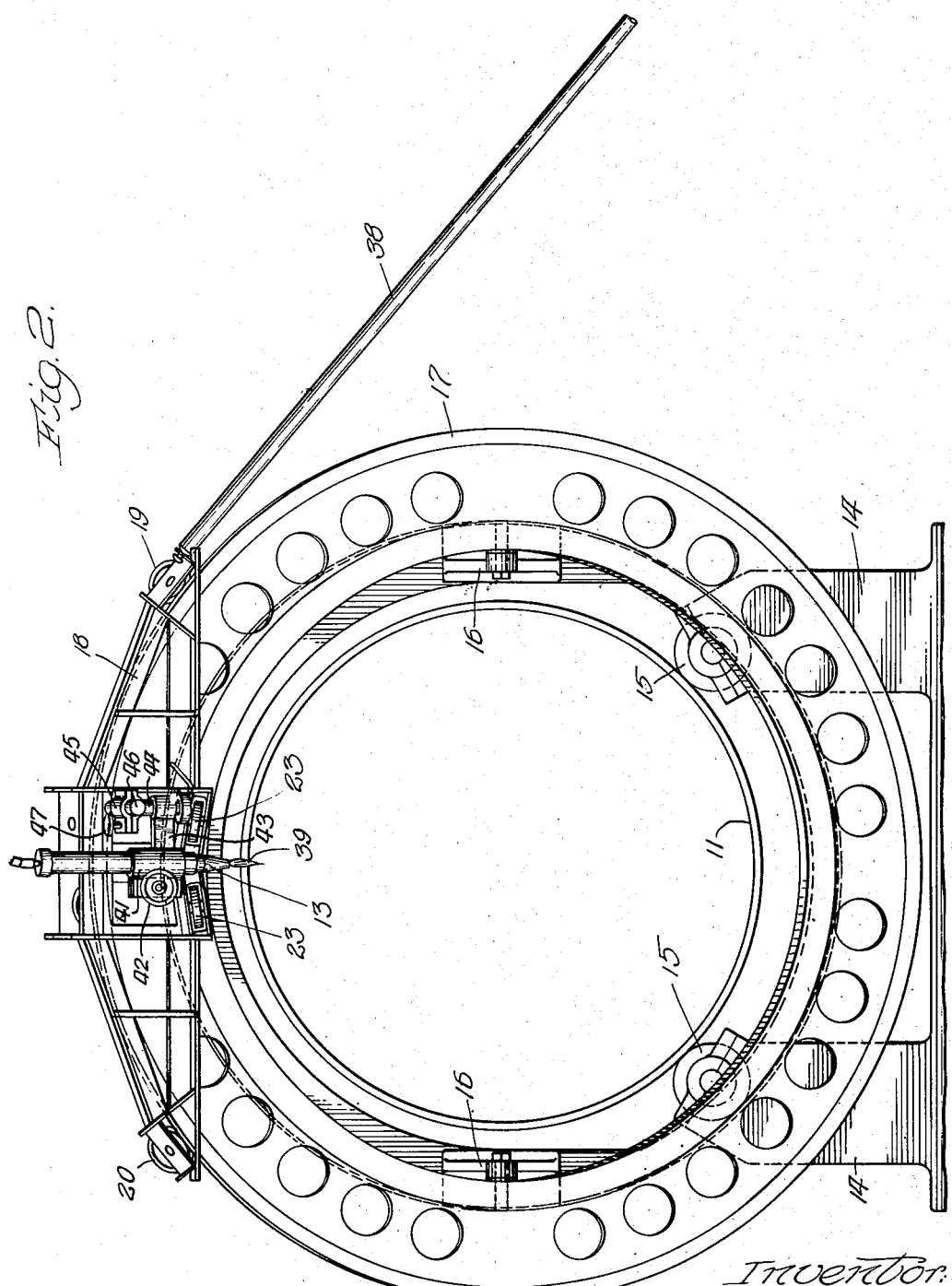

Jan. 25, 1949. M. N. LEBEDEFF 2,459,823
PIPE MITERING APPARATUS
Filed Feb. 11, 1946 3 Sheets-Sheet 3
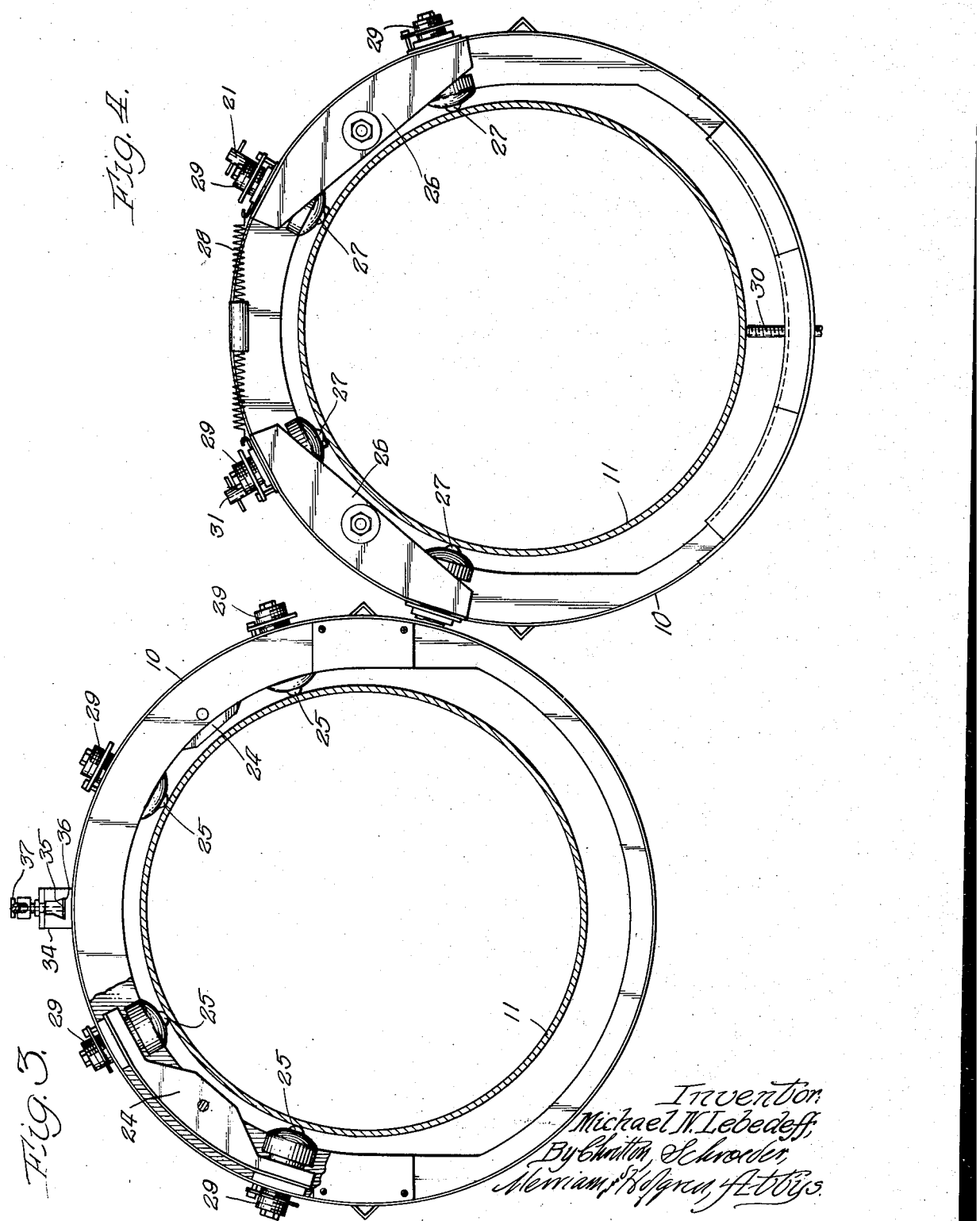
Inventor:
Michael N. Lebedeff,
By Chritton, Schroeder,
Merriam & Hofgren, Attys.

Patented Jan. 25, 1949

2,459,823

UNITED STATES PATENT OFFICE 2,459,823

PIPE MITERING APPARATUS

Michael N. Lebedeff, Chicago, Ill., assignor to Chicago Bridge & Iron Company, a corporation of Illinois Application February 11, 1946, Serial No. 646,889

6 Claims. (Cl. 33—21)

This invention relates to an apparatus such as a pipe mitering apparatus for cutting an object at a desired angle to an axis of the object.

It is often difficult to cut large objects such as pipe of large diameter so that an even cleavage will be accomplished, and so that the cut ends of two objects will fit. I have invented a mitering apparatus that is particularly useful on pipes, and with which the objects can be cut at any desired angle to an axis of the object. The apparatus comprises broadly a base member attachable to the object to be cut, a guide member pivotally mounted on the base member and movable to a desired angle with respect to the axis, cutting means carried by the guide member for cutting the object with the cutting means being movable relative to the guide member, and means for causing relative movement between the cutting means and the unit comprising said object, base member, and guide means. With this apparatus it is possible to cut objects at any desired angle and in any desired plane, no matter what the size and weight of the object. The apparatus is easily adjustable to accommodate objects of different sizes, and the angle of cutting can be readily changed.

The invention will be described as related to the embodiment shown in the accompanying drawings. Of the drawings Fig. 1 is a side elevation of a pipe mitering apparatus embodying the invention; Fig. 2 is a front end elevation of the apparatus; Fig. 3 is a vertical section taken along line 3—3 of Fig. 1; and Fig. 4 is a vertical section taken along line 4—4 of Fig. 1.

The pipe mitering apparatus shown in the accompanying drawings comprises a cylinder 10 having a diameter larger than the pipe 11, which is intended to be cut, an annular guide member 12 pivotally held on the cylinder 10 and a cutting torch 13 supported on the guide member 12 and movable relative thereto.

The cylinder 10 is placed around the pipe 11 and is clamped to the pipe. The pipe rests on a holder 14 having rollers 15 contacting the pipe. With this arrangement the pipe 11, cylinder 10, and annular guide member 12 may be rotated around the central axis of the pipe.

The annular guide member 12, which is in the form of a cylinder, has a diameter larger than that of the cylinder 10 and is pivotally mounted on a pair of brackets 16 extending from the front face of the cylinder with the two brackets being located substantially diametrically opposite each other in a horizontal plane. The annular guide member 12 has a raised edge 17 of circular shape at its front surface. This raised edge 17 serves as a guide for the support 18 holding the burning torch 13.

The support 18 which holds the burning torch 13 is in the form of a carriage that extends over a wide arc of the raised edge 17. The support 18 is movably held on the raised edge 17 by means of a plurality of wheels 19, 20, 21, and 22 contacting the edge. Wheels 19 and 20 are at the ends of the support 18 and are inclined back from the edge 17. Wheels 21 and 22 are at substantially the top of the support and are arranged in the shape of a V with their adjacent surfaces contacting opposite sides of the edge 17. Greater stability is given to the support 18 by providing a pair of wheels 23 on the bottom of the support 18 and contacting the front face of the annular guide member 12.

The cylinder 10 is attached to the pipe 11 by providing a pair of rockers 24 rockably mounted on the front portion of the cylinder 10 on opposite sides of the vertical center of the cylinder. Each rocker 24 has two contact points 25 on opposite ends thereof for contacting the surface of the pipe 10. The pairs of contact points are on opposite sides of the vertical center of the pipe 10. Similar rockers 26 are provided at the rear of the cylinder 10, and these rockers have similar contact points 27. The rear rockers 26 have a spring 28 extending between them. All the contact points 25 and 27 are mounted on threaded posts 29 extending through the rockers so as to permit adjustment of the contact points. The rocker arrangement is provided so that adequate contact may be provided on pipes of varying diameter. The pipe 10 is clamped against the rockers by means of a pair of clamps 30 provided on the bottom portion of the cylinder 10 and normally contacting the bottom of the pipe 11. Similar clamps 31 are provided on top of the cylinder 10 in order to obtain a more positive clamping action at this portion of the cylinder. In operation the cylinder 10 is placed around the pipe 11. The cylinder is immediately supported on contact points 25 and 27. The bottom clamps 30 are then turned until the pipe is held securely between these bottom clamps and the contact points. Then the top clamps 31 are turned until they also contact the pipe, thus providing rigid clamping of the pipe within the mitering apparatus.

The annular guide member 12 is rotatable on its brackets 16 to a desired angular position relative to the central axis of the pipe 11. In order to hold the guide member in position there is provided a rod 32 hingedly attached to the top of the guide member 12 and slidably attached to the cylinder 10. Mounted upon the cylinder 10 is a member 34 having therein a wedge shaped groove 36 extending longitudinally of the axis of the cylinder. The rod 32 is pivotally connected to a slider 35, the slider having a lower wedge shaped portion adapted to slide in the groove 36. The slider 35 is provided with a vertical set screw 37 adapted to press against the bottom of the member 34 to hold the slider in any position by wedging it against the groove 36. Thus, the annular guide member 12 may be rotated through its arc and clamped in any desired position by tightening the set screw 37.

After the cylinder 10 has been placed on the pipe 11 and attached thereto, cutting is accomplished by holding the support 18 for the torch 13 stationary and rotating the pipe 11, cylinder 10, and guide member 12 about the center of the pipe 11. This holding is accomplished by providing a rigid brace 38 extending from the support 18 to the ground or other base. As shown in Fig. 2, when the cylinder and pipe are turned in a clockwise direction the brace 38 will hold the support 18 and the burning torch 13 stationary, while the flame 39 from the torch 13 cuts the pipe along a line 40.

The torch 13 is mounted in a collar 41 and may be moved toward or away from the pipe by sliding it within the collar and may be clamped in such position by tightening the set screw 42. The collar 41 is mounted upon a bar 43 which is fixed to a vertical rod 44 which is attached to a collar 45. The collar 45 surrounds a rod 46, which rod is mounted upon and extends away from the guide member. By loosening the set screw 47, the collar 45 may be slid upon the rod 46 and hence the bar 43, collar 41 and torch 13 may be moved toward and away from the guide member.

Having described my invention as related to one embodiment of the same, it is my intention that the invention be not limited by any of the details of description unless otherwise specified, but rather be construed broadly within its spirit and scope as set out in the accompanying claims.

I claim:

1. Apparatus for cutting pipe or the like at a desired angle to the central axis of said pipe comprising mounting means holding the pipe for rotation substantially about its central axis, a cylinder of larger diameter than the pipe, means for attaching the cylinder to said pipe, an annular guide member of larger diameter than said pipe pivotally mounted on the cylinder at points substantially diametrically opposite each other, a raised section rigidly secured to said annular guide member having a substantially circular shape, means for holding said annular guide member at a desired angular position with respect to the central axis of the pipe, cutting means carried on the raised section of the guide member for cutting the pipe, a plurality of rollers mounted on the cutting means with the cutting means being movable on said rollers relative to said raised section, and means for holding the cutting means substantially stationary during rotation of the pipe, cylinder and guide member.

2. Apparatus for cutting pipe or the like at a desired angle to the central axis of said pipe comprising mounting means holding the pipe for rotation substantially about its central axis; a cylinder of larger diameter than the pipe; means for attaching said cylinder to the pipe including a pair of members rockably mounted on said cylinder near one end thereof and another pair of said members similarly mounted on the other end of the cylinder, each pair of members being located on opposite sides of the vertical center of the cylinder near the top and each member having two contact portions for contacting the pipe on one side of said vertical center, and clamps on the bottom portion of the cylinder for clamping the pipe against said contact portions; an annular guide member of larger internal diameter than the external diameter of the pipe and of the cylinder pivotally mounted on arms extending from one end of the cylinder with said arms being substantially parallel to each other in a substantially horizontal plane with said plane substantially bisecting the cylinder; a raised section on said annular guide member of substantially circular shape; means for holding said annular guide member at a desired angle to the central axis of the pipe, cutting means carried on the raised section of the guide member for cutting the pipe with the cutting means being movable on said raised section, and means for holding the cutting means substantially stationary during the rotation of the pipe, cylinder, and guide member.

3. The apparatus of claim 2 wherein the cutting portion of the cutting means is adjustable toward and away from the pipe and toward and away from the guide member.

4. Apparatus for cuting pipe or the like at a desired angle to the central axis of said pipe comprising mounting means holding the pipe for rotation substantially about its central axis; a cylinder of larger diameter than the pipe; means for attaching the cylinder to the pipe including at least one member rockably mounted on said cylinder and having contact portions for contacting the pipe, and a clamp for clamping the pipe against said contact portions; an annular guide member of larger diameter than said pipe pivotally mounted on the cylinder at points substantially diametrically opposite each other; a raised section on the said annular guide member having a substantially circular shape; means for holding said annular guide member at a desired angular position with respect to the central axis of the pipe; cutting means carried on the raised section of the guide member for cutting the pipe with the cutting means being movable on said raised section; and means for holding the cutting means substantially stationary during rotation of the pipe, cylinder and guide member.

5. Apparatus for cutting pipe or the like at a desired angle to the central axis of said pipe comprising mounting means holding the pipe for rotation substantially about its central axis; a cylinder of larger diameter than the pipe; means for attaching the cylinder to said pipe including a pair of members rockably mounted on said cylinder near one end thereof and another pair of said members similarly mounted on the other end of the cylinder, with each member having two contact portions for contacting the pipe, and clamps on a portion of the cylinder opposite the contact portions for clamping the pipe against said contact portions; an annular guide member of larger diameter than said pipe pivotally mounted on the cylinder at points substantially diametrically opposite each other; a raised section on the said annular guide member having a substantially circular shape; means for holding said annular guide member at a desired angular position with respect to the central axis of the pipe; cutting means carried on the raised section of the guide member for cutting the pipe with the cutting means being movable on said raised section; and means for holding the cutting means substantially stationary during rotation of the pipe, cylinder and guide member.

6. Apparatus for cutting pipe or the like at a desired angle to the central axis of said pipe comprising mounting means holding the pipe for rotation substantially about its central axis, a cylinder of larger diameter than the pipe, means for attaching the cylinder to said pipe, an annular guide member of larger diameter than said pipe pivotally mounted on the cylinder at points substantially diametrically opposite each other, a raised section on said annular guide member having a flat front face and having a substantially circular shape, means for holding said annular guide member at a desired angular position with respect to the central axis of the pipe, cutting means carried on the raised section of the guide member for cutting the pipe with said cutting means extending over a substantial arc of said raised section of the guide member, roller members supporting the cutting means and contacting the raised section on either side of the center of said arc, roller members supporting the cutting means and contacting the front face of said annular guide member whereby the cutting means is movable on said roller relative to said raised section, and means for holding the cutting means substantially stationary during rotation of the pipe, cylinder, and guide member.

MICHAEL N. LEBEDEFF.

REFERENCES CITED

The following references are of record in the file of this patent:

UNITED STATES PATENTS

| Number | Name | Date |
| --- | --- | --- |
| 1,542,887 | Irvin et al. | June 23, 1925 |
| 1,692,925 | Brown | Nov. 27, 1928 |
| 1,852,412 | Hickey | Apr. 5, 1932 |
| 2,035,765 | Schmidt | Mar. 31, 1936 |
| 2,057,612 | Formont | Oct. 13, 1936 |
| 2,146,959 | Kugel | Feb. 14, 1939 |
| 2,295,182 | Norton | Sept. 8, 1942 |
| 2,364,963 | Elliott | Dec. 12, 1944 |
| 2,384,128 | Nation | Sept. 4, 1945 |

FOREIGN PATENTS

| Number | Country | Date |
| --- | --- | --- |
| 540,180 | Germany | Dec. 11, 1931 |